(12) United States Patent
Kohavi (10) Patent No.: US 11,483,343 B2
(45) Date of Patent: Oct. 25, 2022

(54) PHISHING DETECTION SYSTEM AND METHOD OF USE

(71) Applicant: CYREN, INC., Mclean, VA (US)

(72) Inventor: Lior Kohavi, Ramat Hasharon (IL)

(*) Notice: Subject to any disclaimer, the term of this patent is extended or adjusted under 35 U.S.C. 154(b) by 402 days.

(21) Appl. No.: 16/522,145

(22) Filed: Jul. 25, 2019

(65) Prior Publication Data

US 2020/0036751 A1 Jan. 30, 2020

Related U.S. Application Data

(60) Provisional application No. 62/702,962, filed on Jul. 25, 2018.

(51) Int. Cl.
*H04L 9/40* (2022.01)

(52) U.S. Cl.
CPC ...... *H04L 63/1483* (2013.01); *H04L 63/1416* (2013.01); *H04L 63/1425* (2013.01); *H04L 63/1433* (2013.01)

(58) Field of Classification Search
USPC .......................................................... 726/22
See application file for complete search history.

(56) References Cited

U.S. PATENT DOCUMENTS

| | | | |
|---|---|---|---|
| 8,468,597 B1 | 6/2013 | Warner | |
| 8,701,185 B2 | 4/2014 | Krishnamurthy | |
| 9,065,850 B1 | 6/2015 | Sobrier | |
| 2007/0192855 A1 | 8/2007 | Hulten | |
| 2010/0186088 A1 | 7/2010 | Banerjee | |
| 2010/0313266 A1 | 12/2010 | Feng | |
| 2011/0282997 A1* | 11/2011 | Prince | H04L 63/1433 709/226 |
| 2011/0314546 A1 | 12/2011 | Aziz | |
| 2013/0332585 A1* | 12/2013 | Hou | H04L 63/1441 709/219 |
| 2014/0173726 A1 | 6/2014 | Varenhorst | |
| 2016/0191548 A1* | 6/2016 | Smith | G06F 21/565 726/23 |
| 2016/0352772 A1 | 12/2016 | O'Connor | |
| 2017/0237753 A1 | 8/2017 | Manning Dawson | |
| 2018/0063190 A1* | 3/2018 | Wright | H04L 63/1416 |

(Continued)

FOREIGN PATENT DOCUMENTS

EP 3125147 2/2017

OTHER PUBLICATIONS

Haruta, Shuichiro, Hiromu Asahina, and Iwao Sasase. "Visual similarity-based phishing detection scheme using image and CSS with target website finder." GLOBECOM 2017-2017 IEEE Global Communications Conference. IEEE, 2017.

(Continued)

*Primary Examiner* — Sakinah White Taylor
(74) *Attorney, Agent, or Firm* — Alphapatent Associates, Ltd; Daniel J. Swirsky (57) ABSTRACT

Detecting a phishing message by providing a phishing detector having a scan engine and a fetcher, detecting a URL in the message by the scan engine, resolving the URL to a webpage by the scan engine, downloading the webpage by the fetcher, analyzing the downloaded webpage by the fetcher to determine whether the webpage is a phishing webpage, and, when the webpage is determined to be a phishing webpage, deleting the message by the scan engine.

18 Claims, 5 Drawing Sheets

(56) References Cited

U.S. PATENT DOCUMENTS

2018/0247483 A1* 8/2018 Lindsay .............. G06Q 20/102
2018/0278627 A1* 9/2018 Goutal ............... H04L 63/1416

OTHER PUBLICATIONS

White, Joshua S., Matthews, Jeanna N., and Stacy, John L., "A method for the automated detection phishing websites through both site characteristics and image analysis." Cyber Sensing 2012. vol. 8408. International Society for Optics and Photonics, 2012.
European search report for EP3599753, dated Nov. 27, 2019.
Kanich, Chris, et al. "No Plan Survives Contact: Experience with Cybercrime Measurement." CSET'11: Proceedings of the 4th conference on Cyber security experimentation and test, Aug. 8, 2011, USENIX Association, Berkeley, CA, USA.

* cited by examiner

PHISHING DETECTION SYSTEM AND METHOD OF USE

FIELD

The present disclosure is of a system for prevention of phishing attacks and more specifically for a phishing detection system featuring real time retrieval, analysis and assessment of phishing webpages.

BACKGROUND

Phishing aims to convince users to reveal their personal information and/or credentials. Phishers can then use the revealed information to gain access to user accounts or to impersonate the phished user. While other phishing attack vectors exist, such as forged emails, or HTML file attachments, the majority of phishing attacks start with a URL. The phishing URL is usually presented as a link in a message received by a potential victim and social engineering is used to convince the recipient to follow the link.

Multiple approaches and systems have been developed to protect users from phishing. Many of these rely on determining whether a URL leads to a phishing page including (1) semantic analysis of the URL, (2) analysis of the webpage that the URL resolves to, and (3) statistical analysis of the URLs.

(1) Semantic analysis of the words within the URL relies on looking for known retail or financial brands in the URL itself or detecting characters using different encoding. This method is not effective since many phishing URLs simply use random characters that have no relation to the brand being impersonated. For example, the phishing page shown in FIG. 3A includes a URL 302 that does not mention PayPal (the impersonated brand in this case). Further, many phishing sites are "multi-brand" looking to steal credentials for any one of a number of target sites on the same phishing webpage and using generic HTTP headers and URLs that evade such methods.

(2) Current phishing webpage analysis techniques are also lacking. Techniques used include: Semantic searches for brand names or keywords (such as login and password) in webpage elements; Looking for links to legitimate domains or elements fetched from other websites; Looking for hidden iframes; Detecting the absence of a favicon; Comparing a hash of the suspected phishing page to a hash of a legitimate phishing target page. These techniques are known to phishing page creators and are easily evaded. For example, phishing pages do include favicons, and hashing techniques can be evaded by making small changes that alter the hash but are not visible to potential victims viewing the page.

(3) Statistical analysis of URLs—such as counting the number of times the same URL is seen in different messages, does not work when the attacker uses mass customization techniques to create "front URLs" where the URL for each potential victim (or groups of potential victims), is slightly varied creating thousands of unique new URL links pointing to the same phishing site. Also, simple counting may not be sufficient to identify targeted phishing attacks, as small numbers of link URLs will not provide enough statistical relevance to confirm a phishing site.

A further difficulty is in the actual resolution of the phishing URL. Centralized analysis by a security provider from the security provider data center allows the attacker to evade detection by identifying known security provider IP address ranges and ignoring the URL requests—resulting in the security provider dismissing the URL as a "dead link". Alternatively the attacker can return a benign response to the security provider that is simply different to what they return to potential victims—again resulting in incorrect classification of a phishing URL as benign. A further evasion technique includes presenting different webpages to different browser types allowing phishers to target specific user types (mobile, desktop).

Another problem of existing phishing detection systems is the time taken to detect phishing sites. Many phishing detection systems begin analysis of a URL only when a user actually clicks on the URL. Where a URL is unknown (has not been seen or analyzed before) many prior art systems will allow the user to visit the URL, rather than disrupt the user's browsing experience. In parallel with the user browsing, the URL and/or webpage will be analyzed using methods as described above. Because this analysis takes time (typically minutes or hours) the "first victim", or even multiple victims are not protected while their phishing page access is used to learn for future users.

It would be advantageous to have a phishing detection and protection system that uses improved analysis methods to overcome the evasiveness of current phishing sites. It would further be useful for the phishing analysis system to retrieve the suspect webpage using the IP address of the recipient to ensure correct resolution. Finally a phishing detection solution should ideally protect all users from actually receiving phishing URLs.

SUMMARY

The present disclosure overcomes the deficiencies of the background art by providing a phishing analysis system that uses improved analysis methods to overcome the evasiveness of current phishing sites. The solution operates from within the user environment so as to resolve suspected sites from the same IP address ranges as used by actual recipients. Further, the system as described herein provides a near real time URL inspection service that removes already-delivered emails with URLs from the messaging inboxes or message lists of users (before these are opened) such that the users are never exposed to the links and therefore do not click on them.

Improved phishing webpage retrieval and analysis methods as described herein include:

Computing webpage fingerprints for multiple HTML page elements and comparing these webpage fingerprints to existing webpage fingerprints of known phishing page targets and known phishing sites;

Performing image analysis and comparison of the page favicon to favicons known to be used in phishing pages and also genuine favicons of known phishing page targets;

Performing machine learning based image analysis and comparison of the webpage or parts of the webpage to known phishing pages or genuine webpages or parts of genuine webpages of known phishing page targets/brands;

Performing analysis of the webpage CSS and comparison of the webpage CSS to the CSS of known phishing pages or genuine webpages of known phishing page brands/targets;

Performing machine learning based image analysis of images found on webpage 150 aiming to match the images to known genuine phishing target logos;

Performing machine learning based analysis of the language used on the webpage.

The neural network analysis is based on one or more of word counting, term frequency—inverse document frequency, or cluster counting of GloVe (Global Vectors for Word Representation);

Performing analysis of any web form for credential submission in the page;

Fetching the webpage using multiple source IP addresses including from within the user address range;

Fetching the webpage using multiple user agents (browser types)

Attempting Multiple times to resolve the webpage over a configurable period of time to detect phishing pages that are intentionally kept offline following delivery and brought online after a few minutes or hours;

According to at least some embodiments of the present disclosure a method for detecting a phishing message comprises: providing a phishing detector comprising a scan engine and a fetcher; detecting a URL in the message by the scan engine; resolving the URL to a webpage by the scan engine; downloading the webpage by the fetcher; analysis of the downloaded webpage by the fetcher to determine whether the webpage is a phishing webpage; wherein when the webpage is determined to be a phishing webpage, deleting the message by the scan engine.

In some embodiments, the analysis is selected from the group consisting of: performing analysis of the CSS of the webpage and comparison of the webpage CSS to the CSS of known phishing pages or genuine webpages of known phishing page brands/targets; performing machine learning based image analysis of images found on the webpage to match the images to known genuine phishing target logos; performing analysis of web forms for credential submission on the webpage; and a combination of the above.

In some embodiments, the analysis comprises analyzing the HTML structure and HTML code for similarities to known phishing kits. In some embodiments, the analysis is selected from the group consisting of: computing webpage fingerprints for multiple HTML page elements and comparing the webpage fingerprints to existing webpage fingerprints of known phishing page targets and known phishing sites; performing image analysis and comparison of the page favicon of the webpage to favicons known to be used in phishing pages and also genuine favicons of known phishing page targets; performing machine learning based image analysis and comparison of the webpage or parts of the webpage to known phishing pages or genuine webpages or parts of genuine webpages of known phishing page targets/brands; and a combination of the above.

In some embodiments, the analysis comprises performing machine learning based analysis of the language used on the webpage. In some embodiments, the method for the downloading of the webpage is selected from the group consisting of: the webpage is downloaded multiple times each using a different source IP address; the webpage is downloaded using the an IP address from the message recipient IP address range; the webpage is downloaded using multiple user agents; and a combination of the above.

In some embodiments, the machine learning based analysis of the webpage language is based on one or more of word counting, term frequency—inverse document frequency, or cluster counting of GloVe (Global Vectors for Word Representation). In some embodiments, the method of claim 1 further comprises URL analysis by the scan engine for one or more of suspicious characteristics, URL metadata, or suspicious URLs. In some embodiments, the method for the downloading of the webpage comprises: by the fetcher, executing redirect code to resolve the destination web page.

In some embodiments, the method for the downloading of the webpage comprises: when the URL does not resolve, attempting multiple times to resolve the webpage over a configurable period of time until the webpage can be downloaded. In some embodiments, the webpage is downloaded using an IP address from the message recipient IP address range. In some embodiments, site content that is encrypted or obfuscated is decrypted and executed in order to generate the page HTML.

According to at least some embodiments of the present disclosure a system for detecting a phishing message comprises: a scan engine; and a fetcher; wherein the scan engine is adapted to detect a URL in the message and resolve the URL to a webpage; wherein the fetcher is adapted to download the webpage and analyze the downloaded webpage to determine whether the webpage is a phishing webpage; wherein when the webpage is determined to be a phishing webpage, the message is deleted by the scan engine. In some embodiments, the analyzing is selected from the group consisting of: computing webpage fingerprints for multiple HTML page elements and comparing the webpage fingerprints to existing webpage fingerprints of known phishing page targets and known phishing sites; performing image analysis and comparison of the page favicon of the webpage to favicons known to be used in phishing pages and also genuine favicons of known phishing page targets; performing machine learning based image analysis and comparison of the webpage or parts of the webpage to known phishing pages or genuine webpages or parts of genuine webpages of known phishing page targets/brands; performing analysis of the CSS of the webpage and comparison of the webpage CSS to the CSS of known phishing pages or genuine webpages of known phishing page brands/targets; performing machine learning based image analysis of images found on the webpage to match the images to known genuine phishing target logos; performing machine learning based analysis of the language used on the webpage; performing analysis of web forms for credential submission on the webpage; and a combination of the above.

In some embodiments, the downloading of the webpage is selected from the group consisting of: the webpage is downloaded multiple times each using a different source IP address; the webpage is downloaded using the an IP address from the message recipient IP address range; the webpage is downloaded using multiple user agents; when the URL does not resolve, attempting multiple times to resolve the webpage over a configurable period of time until the webpage can be downloaded; and a combination of the above.

According to at least some embodiments of the present disclosure a method for detecting a phishing message comprises: providing a phishing detector comprising a scan engine and a fetcher; detecting a URL in the message by the scan engine; resolving the URL to a webpage by the scan engine; downloading the webpage by the fetcher; analysis of the downloaded webpage by the fetcher to determine whether the webpage is a phishing webpage; wherein when the webpage is determined to be a phishing webpage, deleting the message by the scan engine.

In some embodiments, the analysis is selected from the group consisting of: computing webpage fingerprints for multiple HTML page elements and comparing the webpage fingerprints to existing webpage fingerprints of known phishing page targets and known phishing sites; performing image analysis and comparison of the page favicon of the webpage to favicons known to be used in phishing pages and also genuine favicons of known phishing page targets; performing machine learning based image analysis and comparison of the webpage or parts of the webpage to known phishing pages or genuine webpages or parts of genuine webpages of known phishing page targets/brands; performing analysis of the CSS of the webpage and comparison of the webpage CSS to the CSS of known phishing pages or genuine webpages of known phishing page brands/targets; performing machine learning based image analysis of images found on the webpage to match the images to known genuine phishing target logos; performing machine learning based analysis of the language used on the webpage; performing analysis of web forms for credential submission on the webpage; and a combination of the above.

In some embodiments, the method for the downloading of the webpage is selected from the group consisting of: the webpage is downloaded multiple times each using a different source IP address; the webpage is downloaded using the an IP address from the message recipient IP address range; the webpage is downloaded using multiple user agents; when the URL does not resolve, attempting multiple times to resolve the webpage over a configurable period of time until the webpage can be downloaded; and a combination of the above. In some embodiments, the machine learning based analysis of the webpage language is based on one or more of word counting, term frequency—inverse document frequency, or cluster counting of GloVe (Global Vectors for Word Representation).

According to at least some embodiments of the present disclosure a system for detecting a phishing message comprises: a scan engine; and a fetcher; wherein the scan engine is adapted to detect a URL in the message and resolve the URL to a webpage; wherein the fetcher I adapted to download the webpage and analyze the downloaded webpage to determine whether the webpage is a phishing webpage; wherein when the webpage is determined to be a phishing webpage, the message is deleted by the scan engine.

In some embodiments, the analyzing is selected from the group consisting of: computing webpage fingerprints for multiple HTML page elements and comparing the webpage fingerprints to existing webpage fingerprints of known phishing page targets and known phishing sites; performing image analysis and comparison of the page favicon of the webpage to favicons known to be used in phishing pages and also genuine favicons of known phishing page targets; performing machine learning based image analysis and comparison of the webpage or parts of the webpage to known phishing pages or genuine webpages or parts of genuine webpages of known phishing page targets/brands; performing analysis of the CSS of the webpage and comparison of the webpage CSS to the CSS of known phishing pages or genuine webpages of known phishing page brands/targets; performing machine learning based image analysis of images found on the webpage to match the images to known genuine phishing target logos; performing machine learning based analysis of the language used on the webpage; performing analysis of web forms for credential submission on the webpage; and a combination of the above.

In some embodiments, the downloading of the webpage is selected from the group consisting of: the webpage is downloaded multiple times each using a different source IP address; the webpage is downloaded using the an IP address from the message recipient IP address range; the webpage is downloaded using multiple user agents; when the URL does not resolve, attempting multiple times to resolve the webpage over a configurable period of time until the webpage can be downloaded; and a combination of the above. In some embodiments, the machine learning based analysis of the webpage language is based on one or more of word counting, term frequency—inverse document frequency, or cluster counting of GloVe (Global Vectors for Word Representation).

The term phishing as used herein refers to a cyber-attack that aims to steal user personally identifiable information (PII) or user credentials or user financial information—by tricking the user into willingly disclosing this information. Phishing sites typically "impersonate" sites of well-known brands. These well-known brands are also referred to herein as target brands, or phishing brands. Non-limiting examples of brands that are typically phished include: PayPal, Apple (iCloud), banking sites, Gmail, Yahoo mail, and so forth.

The term URL (Uniform Resource Locator) as used herein may also refer to a web link and includes a domain and optionally subdomain and other information necessary to lead a user to a resource or page on a web server. A URL is resolved as known in the art to determine the IP address of the web site or webpage.

The term "user" as used herein refers to an end user of a messaging network such as an email system or social network wherein the end user receives and sends email messages via the email system or social network messages via the social network. Non-limiting examples of private messaging networks or social networks include Facebook™ WhatsApp™, Slack™, Outlook365™, SalesForce™ and so forth.

The term "malware" as used herein describes any form of malicious or intrusive software, including computer viruses, worms, Trojan horses, rootkits, backdoors, ransomware, spyware, adware, scareware, malicious objects, and other malicious programs, and these terms may be used interchangeably herein. Malware as used herein may be in the form of executable code, scripts, active content, and other software. Antivirus (AV) may also be referred to as anti-malware and the terms may be used interchangeably herein.

As used herein the terms "machine learning" (ML) or "artificial intelligence" (AI) refer to use of algorithms on a computing device that parse data, learn from this data, and then make a determination, where the determination is not deterministically replicable (such as with deterministically oriented software as known in the art).

Implementation of the method and system of the present disclosure involves performing or completing certain selected tasks or steps manually, automatically, or a combination thereof. Moreover, according to actual instrumentation and equipment of preferred embodiments of the method and system of the present disclosure, several selected steps could be implemented by hardware or by software on any operating system of any firmware or a combination thereof. For example, as hardware, selected steps of the disclosure could be implemented as a chip or a circuit. As software, selected steps of the disclosure could be implemented as a plurality of software instructions being executed by a computer using any suitable operating system. In any case, selected steps of the method and system of the disclosure could be described as being performed by a data processor, such as a computing platform for executing a plurality of instructions.

Although the present disclosure is described with regard to a "computer" on a "computer network", it should be noted that optionally any device featuring a data processor and the ability to execute one or more instructions may be described as a computer, computing device, or mobile computing device, or user device including but not limited to any type of personal computer (PC), a server, a cellular telephone, an IP telephone, a smartphone, a PDA (personal digital assistant), or a pager. A server as used herein may refer to any of a single server, multiple servers, distributed servers, virtual servers, or cloud computing environment. Any two or more of such devices, as listed above, in communication with each other may optionally form a computer network.

BRIEF DESCRIPTION OF THE DRAWINGS

The disclosure is herein described, by way of example only, with reference to the accompanying drawings. With specific reference now to the drawings in detail, it is stressed that the particulars shown are by way of example and for purposes of illustrative discussion of the preferred embodiments of the present disclosure only, and are presented in order to provide what is believed to be the most useful and readily understood description of the principles and conceptual aspects of the disclosure. In this regard, no attempt is made to show structural details of the disclosure in more detail than is necessary for a fundamental understanding of the disclosure, the description taken with the drawings making apparent to those skilled in the art how the several forms of the disclosure may be embodied in practice.

In the drawings.

DETAILED DESCRIPTION

Figure 1A:
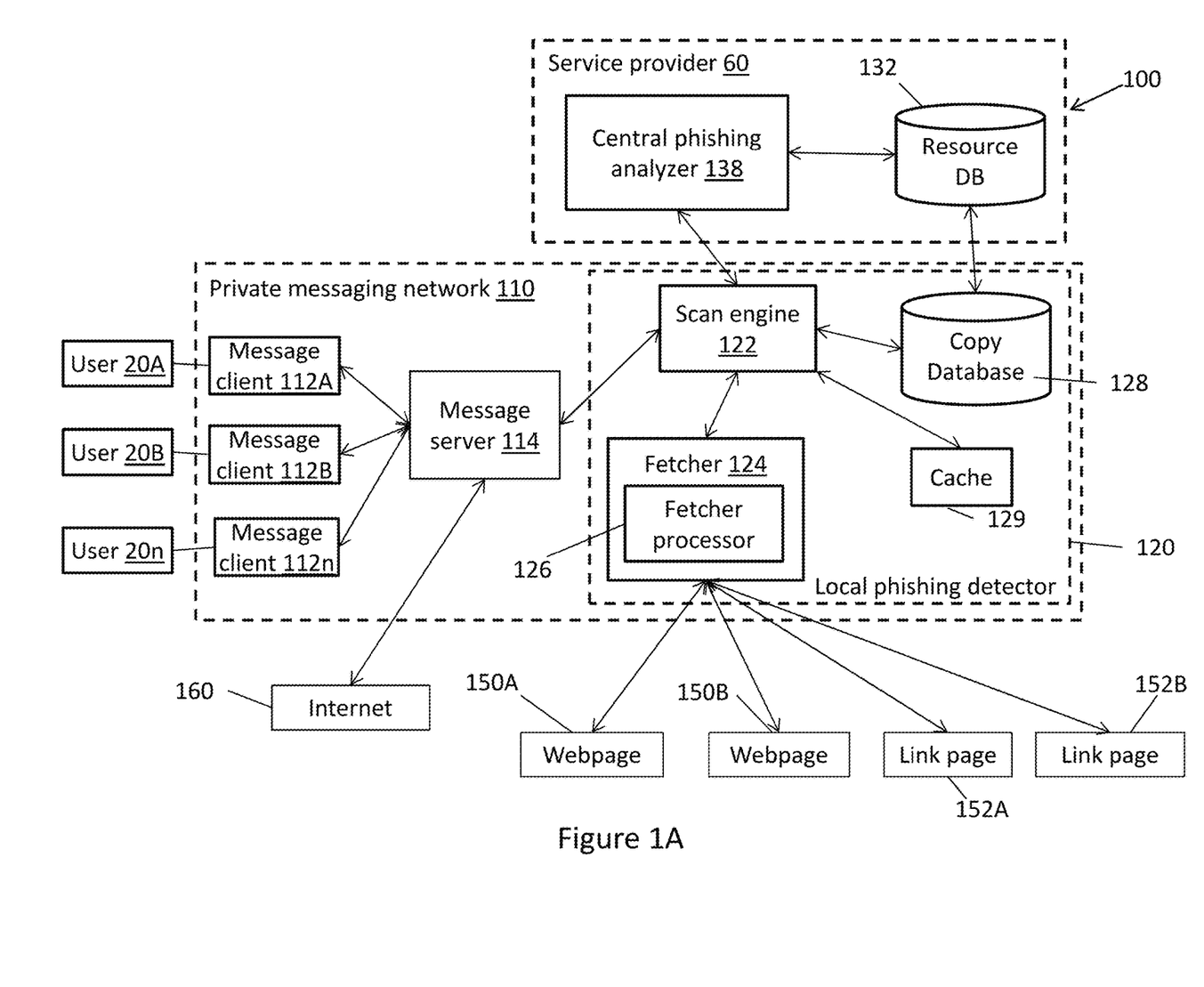
FIGS. 1A and 1B are schematic diagrams of a phishing detection system according to at least some embodiments of the present disclosure.
Figure 1B:
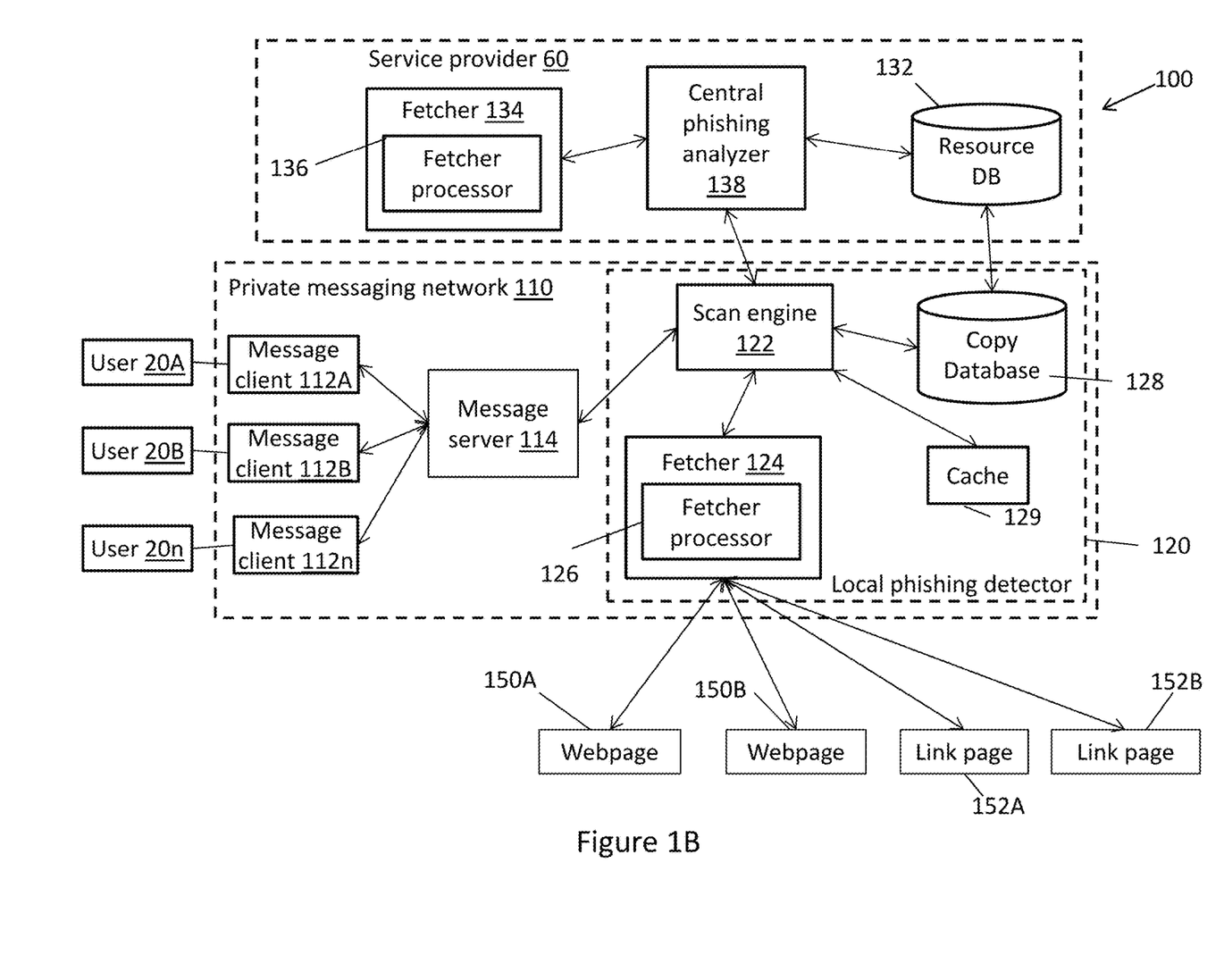

The present disclosure is of a phishing detection system for determining that a URL leads to a phishing site such that the URL or email container can be erased to protect users from phishing attacks. Reference is now made to FIGS. 1A and 1B which are schematic diagrams of a phishing detection system according to at least some embodiments of the present disclosure. As shown in FIG. 1A, phishing detection system 100 includes a URL database 132 provided by a detection service provider 60 and a local phishing detector 120 installed in a private messaging network 110.

Private messaging network 110 is used by users 20 for sending and receiving messages. Network 110 is any one of a cloud messaging network, private organizational email system or social messaging network or other type of messaging network. The components of network 110 are interconnected using networking technologies as known in the art. In some embodiments, the networking connections use secure network communication protocols such as but not limited to TLS. The components of network 110 are optionally collocated or alternatively are not collocated.

FIG. 1 illustrates use of network 110 by three users 20, user 20A, user 20B, and user 20n. The illustrative use by three users 20 should not be considered limiting and it should be appreciated that network 110 may be used by any number of users 20. Users 20 receive and send messages over network 110. Messages are sent between users 20 only within network 110 or alternatively are sent between users 20 and other messaging systems over the Internet or over other messaging networks (not shown).

Network 110 includes a messaging server 114 wherein server 114 receives and sends messages on behalf of users 20. Server 114 is based on a computing device as defined herein and may be a single computer or a server cluster or distributed cloud server. Users 20 interact with server 114 using messaging clients 112—of which three clients 112A, 112B, and 112n are shown without intention to be limiting. It should be appreciated that each user 20 may interact with one or more messaging clients 112 and the relationship is not one to one. Messaging client 112 may be any one of: a dedicated software client or an app for use on a mobile device or a Web application that is accessed using a browser (not shown) and so forth as known in the art.

Messages handled by server 114 may contain URLs and system 100 determines whether these URLs are phishing URLs or not. URLs lead to webpages 150, and the URLs and webpages are analyzed by system 100 to determine if these webpages 150 are phishing pages or alternatively are link pages 152, or are neither. Link pages 152 include HTTP, HTML or JavaScript redirect functionality to direct a visitor from link page 152 to webpage 150. Optionally multiple link pages 152 may be "chained" together such that one link page 152A leads to another link page 152B until an actual destination webpage 150 is reached with any number of link pages in between. It should be appreciated that webpage 150 may be a phishing page but may alternatively be deemed, following analysis as described below, to not be a phishing page. Therefore webpage 150 may also be referred to herein as phishing page 150 once it has been determined to be a phishing page.

Phishing URL detection is provided by a service provider 60 where service provider 60 provides local and remote software modules for detection of phishing URLs in messages of network 110. Resource database 132 includes URL categorizations of URLs as phishing or other categories of URLs, URL and domain reputation, detection rules, fingerprint dictionaries, and known phishing characteristics. Service provider 60 uses one or more of automated machine learning, external sources, the results of the analyses described below and human-assisted techniques to continually update resource DB 132.

Service provider 60 also operates a central phishing analyzer 138 for analyzing suspected phishing URLs and phishing characteristics in DB 132 and for detecting phishing trends and outbreaks as described further below.

The local phishing detector 120 of phishing detection system 100 includes the following components which are software modules that run on a single computing device or on multiple computing devices. The operation of the components of local phishing detector 120 is described in more detail with relation to FIG. 2 below. Local phishing detector 120 includes:

Copy database (DB) 128, which is a copy of resource DB 132. Copy DB 128 is continually updated to match resource DB 132. In some embodiments, updates are performed continually or at fixed time intervals. In some embodiments, updates are incremental changes since the previous update. The network connection between resource DB 132 and copy DB 128 preferably uses a VPN or other secured connection method;

Scan engine 122, which scans messages for URLs and checks whether these URLs are phishing URLs as in process 200 described below;

Fetcher 124, which provides at least the following functionality: validating the URL to determine that it exists;

navigating to webpage 150 optionally via link pages 152, fetching the HTTP headers and HTML contents of webpage 150 and analyzing webpage 150 to determine whether it is a phishing page. In some embodiments, fetcher 124 uses a headless browser, a web browser without a graphical user interface, for retrieval of webpage 150;

Fetcher Processor 126 parses the fetched HTTP headers and HTML pages, fetches additional external JavaScript (JS) content for evaluation. In some embodiments, fetcher processor 126 sanitizes the HTML such as by removing malicious tags and scripts to protect system 100 against cross site scripting attacks and other threats.

Service provider 60 optionally also operates a fetcher 134 and fetcher processor 136 (FIG. 1B) for providing the same functionality as fetcher 124 and fetcher processor 126 but from the central data centers of service provider 60. In some embodiments, fetcher 134 uses a headless browser.

System 100 is optionally scalable to support any number of concurrent analyses of webpages by addition of hardware and components as required. All components and processes of the system 100 are in data communication with one another as required using wired or wireless communication protocols as known in the art.

Figure 2:
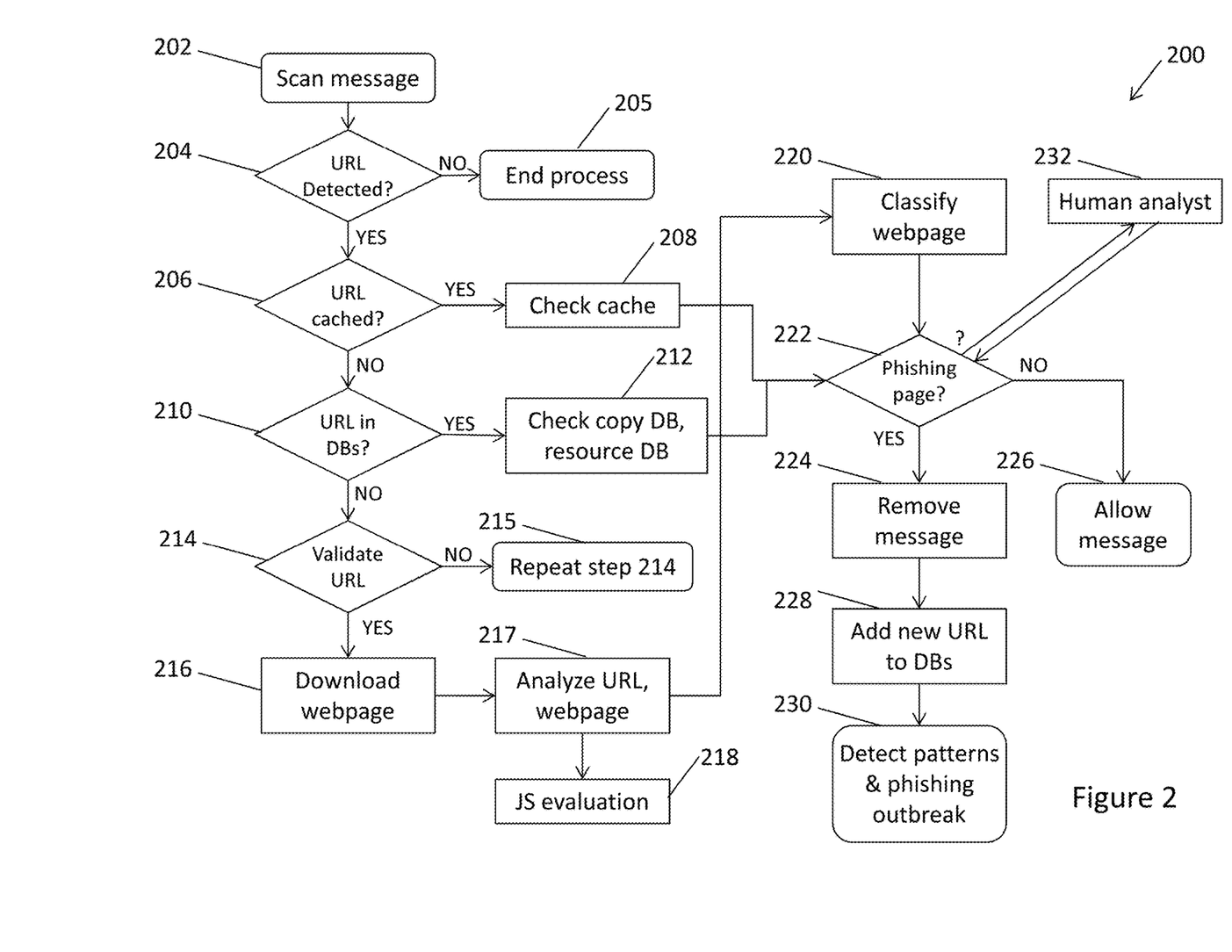
FIG. 2 is a flow diagram describing the operation of a phishing detection system according to at least some embodiments of the present disclosure.

Reference is now made to FIG. 2 which is a flow diagram describing the operation of a phishing detection system according to at least some embodiments of the present disclosure. The process 200 of FIG. 2 is implemented on system 100 as described with reference to FIG. 1 above. In step 202 of process 200 message server 114 provides a received message for scanning by scan engine 122. The message may be delivered to inbox or message list of the message client 112 or may be held in the message server pending the analysis of process 200. In decision step 204 scan engine 122 analyzes the message to determine whether the message includes one or more message URLs. If no message URL is found then, in step 205, process 200 is terminated. When more than one URL is found in the message, the steps of process 200 are performed for each URL individually.

Steps 206 and 210 aim to determine whether the message URL is a phishing URL based on cache 129 and DB 128, 132 lookups. Determining a phishing URL based on these methods first results in lower resource usage than that required for full site analysis. If a message URL is found in step 204 then in decision step 206, cache 129 is checked by scan engine 122 to determine whether the message URL has already been classified as either a phishing site or a known trusted site (whitelist). If the message URL exists in cache 129 then in step 208 the message URL classification is retrieved from cache 129. Following step 208 step 222 evaluates whether the message URL is a phishing page and process 200 continues as described below. In some embodiments, step 206 is preformed after step 204 when message server 114 provides a received message for scanning. Alternatively or additionally, step 206 and the subsequent steps of process 200 are performed repeatedly, every configurable period for a configurable series of periods to determine whether behavior of any message URLs in the message have changed. As a non-limiting example, the same message may be rescanned every 12 hours for a 5 day period.

If the message URL is not found in step 206 then in decision step 210, copy DB 128 and optionally also resource DB 132 (FIG. 1B) are checked by scan engine to determine whether the message URL has already been classified as either a phishing site or a known trusted site (whitelist). If the message URL exists in copy DB 128 or resource DB 132 then in step 212 the message URL classification is retrieved. Following these, decision step 222 evaluates whether the message URL is a phishing page or leads to a phishing page, i.e.: whether the classification returned by copy DB 128 indicated the URL as a known phishing URL and process 200 continues as described below. Matching the message URL may also include matching of most of the message URL to a known phishing URL. A non-limiting example of such a partial match that is still considered a URL match is where the message URL and matched phishing URL are identical aside from the final subdomain.

If the message URL is not found in step 210 then one or both of local fetcher 124 or central fetcher 134 are used to retrieve and analyze the URL. It should be appreciated that the following steps are aimed at 1) reaching the suspected destination phishing page and then 2) analyzing the suspected page, both parts of which are made non-trivial by current evasive phishing techniques. The choice of which fetcher to use (124 or 134) depends on the deployment model. If the deployment model of system 100 is as shown in FIG. 1A then only the local fetcher 124 will be used. If the deployment is as per FIG. 1B then both of fetchers 124 and 134 will be used. The following steps describe the use of both fetchers 124, 134 (as in FIG. 1B) but it should be understood that, for the deployment of FIG. 1A, only the local fetcher 124 will be used. Several of the following steps are described herein as phishing score contributors. A phishing score contributor is an analysis that results in a score rating of the site as a suspected phishing site. The score from each phishing score contributor are totaled at the end of the analysis to determine the probability that the message web site is a phishing site.

In decision step 214 fetchers 124, 134 validate the message URL to determine that the message URL is still live (resolves to a webpage 150). Fetchers 124, 134 will access the message URL which may be a link page 152. If the message URL is a link page 152 then fetchers 124, 134 will follow the links in link pages 152 to reach the destination webpage 150. At each live link page 152 found, as well as the destination webpage 150 fetchers 124, 134 will repeat steps 206, 208, 210, and 212 to analyze these linked URLs, since the link URLs and the destination URL 150 may already be known and listed in cache 129 or DBs 128 and/or 132. Fetcher 134 may optionally make use of alternate source IP addresses associated with different countries or regions, and/or use IP anonymizers such as proxy services, and/or use different cloud application services (which show different source IP addresses) in order to validate the message URL.

In some embodiments, fetchers 124 and 134 will execute redirect code found in link pages 152, such as executing redirect code in a sandbox, in order to determine the redirected site that a user accessing the site would actually see. Such code execution is required as simple text analysis of the redirect code is typically not sufficient to determine which page such a link page 152 is redirecting to. Such redirect code may include sleep-timers, and fetchers 124 and 134 are adapted for executing or analyzing redirect code to reach the redirect URL without waiting for the timers to expire.

In some embodiments, if the message URL does not resolve to a webpage then in step 215, step 214 is restarted after a wait period configured in system 100. This wait period is effective for phishing pages that activate several minutes or hours after delivery of the message URL. Step 214 will be repeated several times as configured in system 100 with the configured wait period between each attempt until the message URL is validated. If the message URL is not validated after the number of attempts as configured in system 100 then process 200 is abandoned.

If the message URL is validated in step 214 then in step 216, the HTML headers and content of the webpage are downloaded by fetchers 124, 134. It should be noted that fetcher 124 fetches webpage 150 from the same IP address as that of server 114. The result is that website 150 will respond as it would to a user coming from the same IP address. Fetcher 134 fetches webpage 150 from the same IP address as that of service provider 60, which may result in a different webpage being delivered (since the geographical area of the fetching IP address of fetcher 134 is different to fetcher 124).

Fetcher 134 may optionally make use of alternate source IP addresses associated with different countries or regions, and/or use IP anonymizers such as proxy services, and/or use different cloud application services (which show different source IP addresses) in order to obtain different responses from webpage 150 which may respond differently depending on the source IP of the request. It should be appreciated that the use of a local fetcher 124 is advantageous as the HTML headers and content are the same as would be presented to the target user 20 that the original message URL was sent to. Identification of different responses to fetcher 124 and 134 and/or different responses to requests sent from different IP addresses and/or different responses over different periods of time are typically indicators of a phishing or malware site using evasive behavior and this "multi-response" or delayed response behavior is a phishing score contributor.

Fetchers 124, 134 fetch webpage 150 for analysis several times each time stating different user agents in the HTTP header. This step is required since webpage 150 may provide different content depending on the user agent used in the page request. significant differences in content provided for different user agents is also a potential indicator of a phishing site and is a phishing score contributor.

In step 217 the validated message URL and the URL of webpage 150 are analyzed by fetcher 124 or scan engine 122 for suspicious characteristics including but not limited to: presence of brand names, multiple periods (dots), multiple slashes, multiple words, multiple characters, and length of words. Further, URL metadata (WhoIs analysis) is analyzed including but not limited to: date of domain registration, domain privacy, owner of domain, and so forth. Recently registered domains or domains that have no relation to the brand detected in the URL are considered suspicions. In some embodiments, machine learning processes are employed for detection of suspicious URLs based on a training dataset comprising known phishing URLs. The result of the URL analysis step 217 is a scoring of the analyzed URL as suspicious or not. In some embodiments, URL analysis is performed before step 214. URL analysis is a phishing score contributor.

Further, in step 217, the domain reputation of the suspected website 150 is checked in DBs 128 and/or 132. Domain reputation is a phishing score contributor.

Further in step 217 the downloaded HTTP headers and HTML content of webpage 150 are analyzed by fetcher 124. In some embodiments, site content that is encrypted or obfuscated is decrypted and executed, such as in a sandbox, in order to generate the webpage (and HTML) that a user would actually see so that the following analyses can be performed on such a generated webpage. Such an execution is advantageous as the obfuscated code will not provide any possibility for further analysis. Use of obfuscated/encrypted code is a further potential indicator of a phishing site and this factor is a phishing score contributor.

Figure 3A:
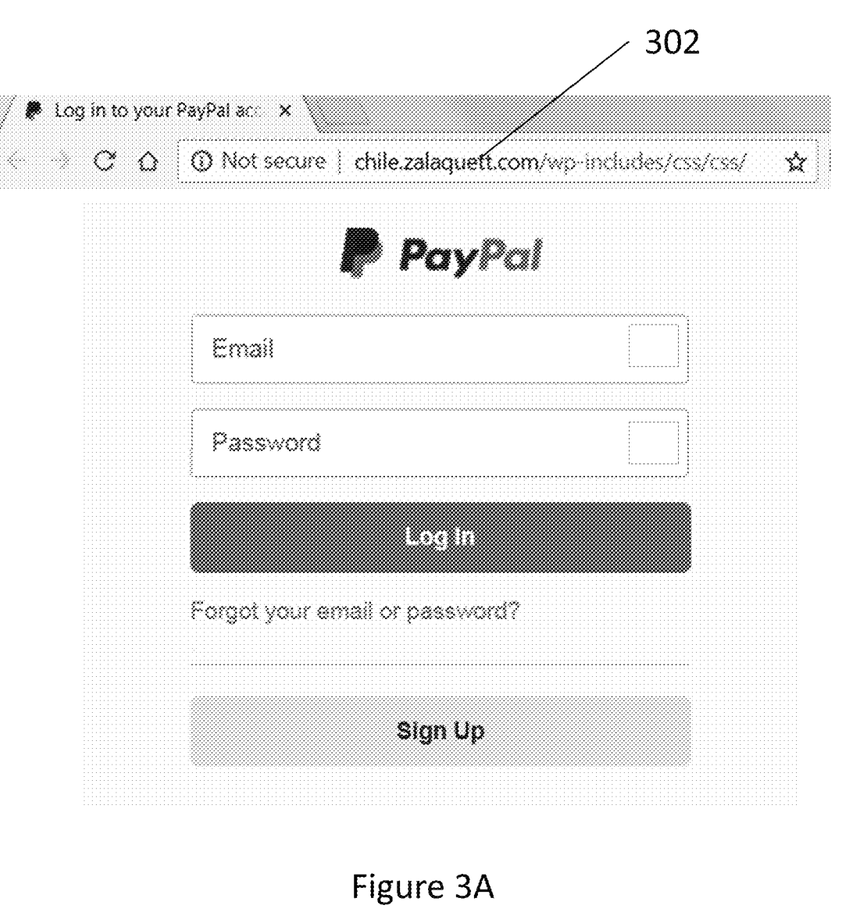
FIGS. 3A and 3B are respectively exemplary screenshots of a phishing website and a legitimate brand target website.
Figure 3B:
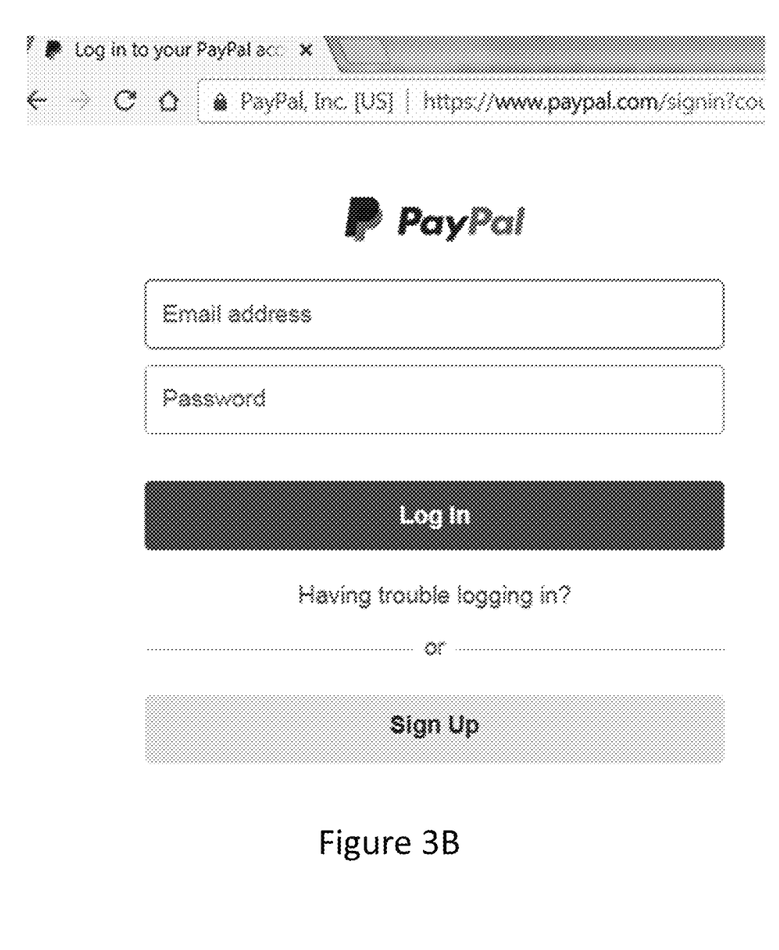

The analysis of step 217 includes one or more of the following analyses each of which is a phishing score contributor:

Computing webpage fingerprints for HTML page elements and comparing these webpage fingerprints to existing webpage fingerprints (stored in copy DB 128). DB 128 also comprises fingerprints of known phishing page targets (genuine pages of known brands). When the page under analysis contains a fingerprint that matches a stored fingerprint of a known phishing page or a stored fingerprint from a genuine page of a known brand target, the page under analysis is likely to be a phishing page. Fingerprinting comprises converting the analyzed element into a hash value using a hashing algorithm such as but not limited to MD5 or SHA or similar. The page elements that are fingerprinted include but are not limited to: page length (characters), header length (characters), page title, favicon, page URL, keywords, on-page JavaScripts, external JavaScripts, images, page description, and forms. Each element results in a separate fingerprint. In some embodiments, two or more elements are combined to form a fingerprint. Computed fingerprints for the page under analysis are added to copy DB 128 and resource DB 132 so as to continually expand the store of fingerprints for comparison. Machine learning techniques are used to correlate fingerprints and detect attack trends;

Performing image analysis on the webpage favicon. A library of genuine brand favicons of known phishing page targets are stored in resource DB 132 and copy DB 128. Additionally, favicons known to be used in phishing pages are stored in resource DB 132 and copy DB 128. The image analysis compares the page favicon to the stored brand and phishing favicons. When favicons of known phishing pages and/or brands are detected by the image comparison, the page under analysis is likely to be a phishing page. It should be appreciated that the image comparison uses ML techniques and the image comparison is not simply an exact file hash match comparison (although this technique is also used);

Performing image analysis and comparison of the webpage 150 or parts of the webpage 150 to known phishing pages or genuine webpages or parts of genuine webpages of known phishing page targets/brands which are stored in resource DB 132 and copy DB 128. The analysis is based on a screenshot of the page under analysis which is analyzed as a complete image or analyzed as multiple images in parts of the page. When the page images under analysis match or are sufficiently similar to those of known phishing page targets/brands, the page under analysis is likely to be a phishing page. For example, the phishing page of FIG. 3A is not identical to the genuine page of FIG. 3B but an approximate visual comparison based on machine learning techniques would establish that the page of FIG. 3A is an imitation of the genuine page of FIG. 3B and therefore likely a phishing page. Machine learning techniques are improved by each detection. Further, image analysis is used to detect the presence on webpage 150 of a logo or logos of brands that are known phishing targets. As a non-limiting example, the presence of a brand logo on a page with a recently registered domain would be considered suspicious;

Performing analysis of the webpage CSS and comparison of the webpage CSS to the CSS of known phishing pages or genuine webpages of known phishing page brands/targets which are stored in copy DB 128. When the page CSS under analysis matches or is sufficiently similar to the CSS for known phishing pages or genuine webpages of known phishing page brands/targets, the page under analysis is likely to be a phishing page;

Analyzing the HTML structure and HTML code for similarities to known "phishing kits". Phishing kits are code packages that make it simpler for phishers to deploy phishing sites. Instead of coding a phishing site from scratch or copying an existing brand page, a phisher can use a phishing kit to quickly configure and install many phishing sites. Since phishing sites generated from phishing kits share similar code, detection of this code in the HTML of the site indicates potential use of a phishing kit and increases the possibility that webpage 150 is a phishing webpage.

Performing analysis of any web form for credential submission in the page. Phishing forms may include characteristics that are regarded by fetcher 124 as suspicious. Non-limiting examples of these characteristics include: Use of PHP for form submission—a technique generally not used in legitimate websites; requests for fields that are generally not requested such as bank PIN codes, or fields that are out of context or generally not requested together such as requesting passport numbers as well as social security numbers or extensive amounts of user PII. Further, login or credential submission methods of brand sites are stored in DBs 132 and 128 for comparison to the credential submission method used on the analyzed page. Differences used in the login methods may indicate a suspicious site;

Performing image analysis of images found on webpage 150 aiming to match the images to known genuine phishing target logos. As above, the image comparison is not simply an exact hash comparison of the image on the website to the well-known brand logo but rather a machine learning based visual comparison for detecting images that are sufficiently similar. Webpages containing one or more target phishing site logos are more likely to be phishing pages;

Performing machine learning based analysis of the language used on webpage 150. The neural network analysis is based on one or more of word counting, term frequency—inverse document frequency, or cluster counting of GloVe (Global Vectors for Word Representation). The machine learning aims to discover language that is commonly found on phishing pages and therefore determine the likelihood that webpage 150 is a phishing page. Optionally, language analysis is also applied to the original message that contained the URL and if it is determined that the message contains language associated with phishing messages then this will contribute to the scoring of the URL as being a phishing URL. machine learning techniques are improved based on each detection;

When JavaScript elements are found in webpage 150, these are analyzed in step 218 by fetcher processor 126;

Following URL validation and analysis of webpage 150, the scores for each of the phishing score contributors are totaled in step 220 to classify webpage 150. In step 222 the final score is assessed by scan engine 122 to determine whether webpage 150 is a phishing page.

If in step 222 it is determined that webpage 150 is a phishing page, then in step 224 the message is removed from message server 114 (if it has been held in the message server 114 pending analysis) or removed from the user 20 inbox or message list in client 112. If the URL is not a phishing page then in step 226 the message is allowed to remain in the inbox or message list of the user 20. Step 224 takes place at any time when a phishing URL determination is made, whether following initial delivery of the message or in a subsequent review of the URL some time later.

In step 228, where destination webpage 150 is determined to be phishing using any of the analysis methods above, the phishing webpage 150 and all link pages 152 associated with the determined destination phishing page 150 are recorded in DBs 128 and 132. The finding of known phishing URLs retrieved in steps 208 and 212 is also recorded in DBs 128 and 132 so as to monitor trends by analyzer 138 (step 230) such as the prevalence of specific URLs.

It may thus be determined in step 230 following monitoring by central analyzer 138 of the newly detected URLs added to DB 132, that multiple analyzed link pages 152 are all leading to the same destination phishing webpage 150 and/or that a specific domain or group of domains are being used as part of a coordinated phishing attack outbreak. Central analyzer 138 then proactively classifies the link pages 152 and also any related domains as phishing domains in DBs 128 and 132 to block the outbreak.

Characteristic that are an outcome of any of the analyses performed on webpage 150 as described above are defined by system 100 as phishing characteristics once analyzed page 150 is determined to be phishing. Such a repeating characteristic may be an outcome of any of the analyses performed on webpage 150 as described above including but not limited to, a repeating favicon, JavaScript, web form, page image, word cluster or similar. These phishing characteristics are sent by fetchers 124, 134 to DB 132. Central analyzer 138 performs pattern detection monitoring on phishing characteristics such that a phishing characteristic that is repeated more than a predetermined number of times may be determined to be an indicator of a phishing page resulting in a higher score for a page containing the determined phishing characteristic. These phishing characteristics are therefore stored in DBs 128, and 132 and fetchers 124, 134 scores any webpage exhibiting these phishing characteristics as having a higher probability of being phishing pages.

If, following the scoring of step 217, the status of the webpage is in doubt, then in step 232, the webpage is analyzed by a human analyst. The human analyst adapts or adds rules in DBs 132 and 128 to improve future analyses of step 217 and machine learning models which thus continue to improve. The results of the human analysis of step 232 (whether the URL is phishing or not) are fed back into scan engine 122 and step 222 and subsequent steps are followed as above.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure.

While the disclosure has been described with respect to a limited number of embodiments, it will be appreciated that many variations, modifications and other applications of the disclosure may be made.

What is claimed is:

1. A method comprising:
   a. providing a phishing detector comprising a scan engine and a fetcher, wherein the scan engine and the fetcher are software modules running on at least one computing device;
   b. detecting a URL in a message by the scan engine;
   c. resolving the URL to a webpage by the scan engine;
   d. downloading the webpage by the fetcher, wherein the method for the downloading of the webpage includes, by the fetcher, executing redirect code in a sandbox to resolve the destination web page;
   e. analysis of the downloaded webpage by the fetcher to determine whether the webpage is a phishing webpage; wherein when the webpage is determined to be a phishing webpage, deleting the message by the scan engine,
   wherein analysis of the downloaded webpage includes performing machine learning based image analysis and comparison of the webpage or parts of the webpage to known phishing pages or genuine webpages or parts of genuine webpages of known phishing page targets/brands, and
   wherein the message is in a user inbox and the deleting of the message includes removing the message from the user inbox.

2. The method of claim 1 wherein the analysis is selected from the group consisting of:
   a. performing analysis of the Cascading Style Sheets (CSS) of the webpage and comparison of the webpage CSS to the CSS of known phishing pages or genuine webpages of known phishing page brands/targets;
   b. performing machine learning based image analysis of images found on the webpage to match the images to known genuine phishing target logos; and
   c. performing analysis of web forms for credential submission on the webpage.

3. The method of claim 1 wherein the analysis comprises analyzing the HTML, structure and HTML code for similarities to known phishing kits.

4. The method of claim 1 wherein the analysis includes one or more of:
   a. computing webpage fingerprints for multiple HTML page elements and comparing the webpage fingerprints to existing webpage fingerprints of known phishing page targets and known phishing sites; and
   b. performing image analysis and comparison of the page favicon of the webpage to favicons known to be used in phishing pages and also genuine favicons of known phishing page targets.

5. The method of claim 1 wherein the analysis comprises performing machine learning based analysis of the language used on the webpage.

6. The method of claim 5 wherein the machine learning based analysis of the webpage language is based on one or more of inverse document frequency, or cluster counting of GloVe (Global Vectors for Word Representation).

7. The method of claim 1 wherein the method for the downloading of the webpage includes one or more of:
   a. the webpage is downloaded multiple times each using a different source IP address; and
   b. the webpage is downloaded using multiple user agents.

8. The method of claim 1 further comprising URL analysis by the scan engine for one or more of suspicious characteristics, URL metadata, or suspicious URLs.

9. The method of claim 1 wherein the method for the downloading of the webpage comprises: when the URL does not resolve, attempting multiple times to resolve the webpage over a configurable period of time until the webpage is downloaded.

10. The method of claim 1 wherein the webpage is downloaded using a source IP address from a message recipient IP address range.

11. The method of claim 1 wherein site content that is encrypted or obfuscated is decrypted and executed in order to generate the page HTML.

12. A system comprising:
    a. a scan engine; and
    b. a fetcher;
    wherein the scan engine and the fetcher are software modules running on computing devices; wherein the scan engine is configured to detect a URL in a message and resolve the URL to a webpage; wherein the fetcher is configured to download the webpage and analyze the downloaded webpage to determine whether the webpage is a phishing webpage; wherein when the webpage is determined to be a phishing webpage, the scan engine is configured to delete the message,
    wherein the fetcher is further configured to execute redirect code in a sandbox to resolve the destination web page,
    wherein analysis of the downloaded webpage includes performing machine learning based image analysis and comparison of the webpage or parts of the webpage to known phishing pages or genuine webpages or parts of genuine webpages of known phishing page targets/brands, and
    wherein the message is in a user inbox and the deleting of the message includes removing the message from the user inbox.

13. The system of claim 12 wherein the analyzing includes one or more of:
    computing webpage fingerprints for multiple HTML, page elements and comparing the webpage fingerprints to existing webpage fingerprints of known phishing page targets and known phishing sites;
    performing image analysis and comparison of the page favicon of the webpage to favicons known to be used in phishing pages and also genuine favicons of known phishing page targets;
    performing analysis of the Cascading Style Sheets (CSS) of the webpage and comparison of the webpage CSS to the CSS of known phishing pages or genuine webpages of known phishing page brands/targets;
    performing machine learning based image analysis of images found on the webpage to match the images to known genuine phishing target logos;
    performing machine learning based analysis of the language used on the webpage; and
    performing analysis of web forms for credential submission on the webpage.

14. The system of claim 12 wherein the downloading of the webpage includes one or more of:
    the webpage is downloaded multiple times each using a different source IP address;
    the webpage is downloaded using a source IP address from a message recipient IP address range; and
    the webpage is downloaded using multiple user agents.

15. The system of claim 12 wherein the analysis comprises analyzing the HTML, structure and HTML code for similarities to known phishing kits.

16. The system of claim 12 further comprising URL analysis by the scan engine for one or more of suspicious characteristics, URL metadata, or suspicious URLs.

17. The system of claim 12 wherein the downloading of the webpage comprises: when the URL does not resolve, attempting multiple times to resolve the webpage over a configurable period of time until the webpage is downloaded.

18. The system of claim 12 wherein site content that is encrypted or obfuscated is decrypted and executed in order to generate the page HTML.

\* \* \* \* \*